(12) United States Patent
Stanton

(10) Patent No.: US 7,948,502 B2
(45) Date of Patent: May 24, 2011

(54) METHOD OF DISPLAYING PICTURE HAVING LOCATION DATA AND APPARATUS THEREOF

(75) Inventor: Craig Stanton, Northcote Auckland (NZ)

(73) Assignee: Mitac International Corp., Taoyuan (TW)

( * ) Notice: Subject to any disclaimer, the term of this patent is extended or adjusted under 35 U.S.C. 154(b) by 641 days.

(21) Appl. No.: 12/153,025

(22) Filed: May 13, 2008

(65) Prior Publication Data

US 2009/0284551 A1 Nov. 19, 2009

(51) Int. Cl.
*G09G 5/00* (2006.01)
*G06T 11/20* (2006.01)
(52) U.S. Cl. .......................... 345/629; 345/440; 345/660
(58) Field of Classification Search .................. 345/629, 345/660, 440
See application file for complete search history.

(56) References Cited

U.S. PATENT DOCUMENTS

| | | | |
|---|---|---|---|
| 6,714,215 B1 * | 3/2004 | Flora et al. | 715/716 |
| 7,474,317 B2 * | 1/2009 | Dolph et al. | 345/629 |
| 7,840,344 B2 * | 11/2010 | Sloo | 701/208 |

* cited by examiner

*Primary Examiner* — Ryan R Yang
(74) *Attorney, Agent, or Firm* — Wang Law Firm, Inc.; Li K. Wang

(57) ABSTRACT

One objective of the present invention is to provide a method of displaying picture having location data and apparatus thereof. The method comprising the steps of providing an electronic map and a plurality of pictures having location data, and generating a plurality of thumbnails corresponding to the pictures based on a scale, and then displaying the thumbnails on the electronic map based on the location data of corresponding picture of each thumbnail, and further overlappingly displaying the thumbnails of which the distance between the thumbnails is shorter than a threshold on the electronic map.

32 Claims, 7 Drawing Sheets

METHOD OF DISPLAYING PICTURE HAVING LOCATION DATA AND APPARATUS THEREOF

FIELD OF THE INVENTION

The invention is related to a picture display method and apparatus thereof, and more particularly to a method of displaying picture having location information and apparatus thereof.

BACKGROUND OF THE INVENTION

The traditional method of displaying picture is arranging the pictures by filenames, established dates, file size or file class. However, it is not convenient for a user to display the picture captured in trip. When traveler takes pictures on the trip, he/she usually wants to show the scenery to his/her family or friends by the pictures and tell them where the pictures are taken based on an electronic map. Many image capture apparatus capable of storing the location data into the captured picture are developed, for example, camera combined with the GPS module. What is needed is how to display picture in an efficient way and a meaningful way.

Presently, many travel-guide web sites provide a simple link function to display several pictures when the user clicks the certain tags. Moreover, the iPhone of the Apple company and the application software of the GeoSpatialExperts company also provide the function that display pictures on an electronic map.

But the traditional technology mentioned above must compile the pictures with the electronic map in advance before displaying these pictures and map. The display size of pictures can not adjust in real time when the user zooms in/out the electronic map. In other words, the pictures can't be adjusted automatically when the user adjusts the scale of the electronic map. Therefore, the pictures also can't be recognized clearly and be separated by their location precisely at the same time.

In view of the drawbacks of the traditional art, the inventor of the present invention based on years of experience in the related industry to conduct extensive researches and experiments, and finally developed a method of displaying picture having location data and apparatus thereof in accordance with the present invention to overcome the aforementioned drawbacks.

SUMMARY OF THE INVENTION

It is therefore one of objective of the present invention is to provide a method of displaying picture having location data and apparatus thereof, for improving the efficiency of picture display and management.

Another objective of the present invention is to provide a method of displaying picture having location data and apparatus thereof, for automatically adjusting the display locations of the thumbnails on the electronic map based on the scale of the electronic map.

Another objective of the present invention is to provide a method of displaying picture having location data and apparatus thereof, for recognizing the adjacent thumbnails of which clearly In a first aspect, the invention consists in a method of displaying picture having location data, the method comprises the steps of:

i) providing an electronic map and a plurality of pictures having location data, and ii) generating a plurality of thumbnails corresponding to the pictures based on a scale, and iii) displaying the thumbnails on the electronic map based on the location data of corresponding picture of each thumbnail, and iv) overlappingly displaying the thumbnails of which the distance between said thumbnails is shorter than a threshold.

Preferably, the method further comprises a step of relocating said thumbnails on said zoomed electronic map based on said location data of corresponding picture of each thumbnail when said electronic map is zoomed in/out.

Preferably, the method further comprises a step of relocating said thumbnails on said zoomed electronic map based on said location data of corresponding picture of each thumbnail when said electronic map is zoomed in/out.

Preferably, the method further comprises a step of defining said thumbnails of which the distance between each other is shorter than said threshold value as a thumbnail group.

Preferably, the method further comprises a step of zooming in said electronic map and relocating said thumbnails of said thumbnail group on said zoomed electronic map when said thumbnail group is triggered.

Preferably, the thumbnail can hyperlink to the corresponding pictures when the thumbnail is triggered.

Preferably, the location data can contain longitude and latitude data.

Preferably, the location data can contain address data.

Preferably, the picture also contains a correlation data.

Preferably, the method further comprises a step of selecting said pictures which are desired to display based on the correlation data.

Preferably, correlation data can be a trip data.

Preferably, electronic map is vector based or image based.

Preferably, the image based electronic map can be a satellite photo with the longitude and latitude data.

In a further aspect, the present invention consists in a picture display apparatus comprising:

a storage unit for storing an electronic map and a plurality of pictures having location data;

a display unit; and a processing unit for generating a plurality of thumbnails corresponding to said pictures based on a scale, and driving said display unit to display said thumbnails on said electronic map based on said location data of corresponding picture of each thumbnail and overlappingly display the thumbnails of which the distance between said plurality of thumbnails is shorter than a threshold value on said electronic map.

Preferably, the picture display apparatus further comprises an input unit, and when a user operates the picture display apparatus to zoom in/out the electronic map by the input unit, the processing unit relocates said thumbnails on the zoomed electronic map based on the location data of corresponding picture of each thumbnail.

Preferably, the processing unit defines the thumbnails of which the distance between each other is shorter than the threshold value as a thumbnail group.

Preferably, when the user triggers one thumbnail group by said input unit, the processing unit zooms in the electronic map and relocating the thumbnails of the triggered thumbnail group on the zoomed electronic map.

Preferably, when the user triggers a thumbnail by the input unit, the processing unit drives the display unit to display the corresponding picture.

Preferably, the location data can contain longitude and latitude data.

Preferably, the location data can contain address data.

Preferably, the picture also contains a correlation data.

Preferably, the processing unit selects the pictures which are desired to display based on the correlation data.

Preferably, correlation data can be a trip data.

Preferably, electronic map is vector based or image based.

Preferably, the image based electronic map can be a satellite photo with the longitude and latitude data.

In a further aspect, the invention consists in a method of displaying picture having location data, the method comprises the steps of:

i) providing an electronic map and a plurality of pictures having location data, and ii) generating a plurality of thumbnails corresponding to the pictures based on a scale, and iii) displaying the thumbnails on the electronic map based on the location data of corresponding picture of each thumbnail, and iv) relocating the thumbnails on the zoomed electronic map based on the location data of corresponding picture of each thumbnail when the electronic map is zoomed in/out.

Preferably, the method further comprises a step of overlappingly displaying the thumbnails of which the distance between the thumbnails is shorter than a threshold on said electronic map.

Preferably, the method further comprises a step of defining said thumbnails of which the distance between each other is shorter than said threshold value as a thumbnail group.

Preferably, the method further comprises a step of zooming in said electronic map and relocating said thumbnails of said thumbnail group on said zoomed electronic map when said thumbnail group is triggered.

Preferably, the thumbnail can hyperlink to the corresponding pictures when the thumbnail is triggered.

Preferably, the location data can contain longitude and latitude data.

Preferably, the location data can contain address data.

Preferably, the picture also contains a correlation data.

Preferably, the method further comprises a step of selecting said pictures which are desired to display based on the correlation data.

Preferably, correlation data can be a trip data.

Preferably, electronic map is vector based or image based.

Preferably, the image based electronic map can be a satellite photo with the longitude and latitude data.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

FIG. 4B illustrates a schematic view of an embodiment of display of picture and an electronic map after zooming in.

DETAILED DESCRIPTION OF THE PREFERRED EMBODIMENTS

The present invention relates to a method of displaying picture having location data and apparatus thereof. While the specifications describe at least one embodiment of the invention considered best modes of practicing the invention, it should be understood that the invention can be implemented in many ways and is not limited to the particular examples described below or to the particular manner in which any features of such examples are implemented.

Figure 1:
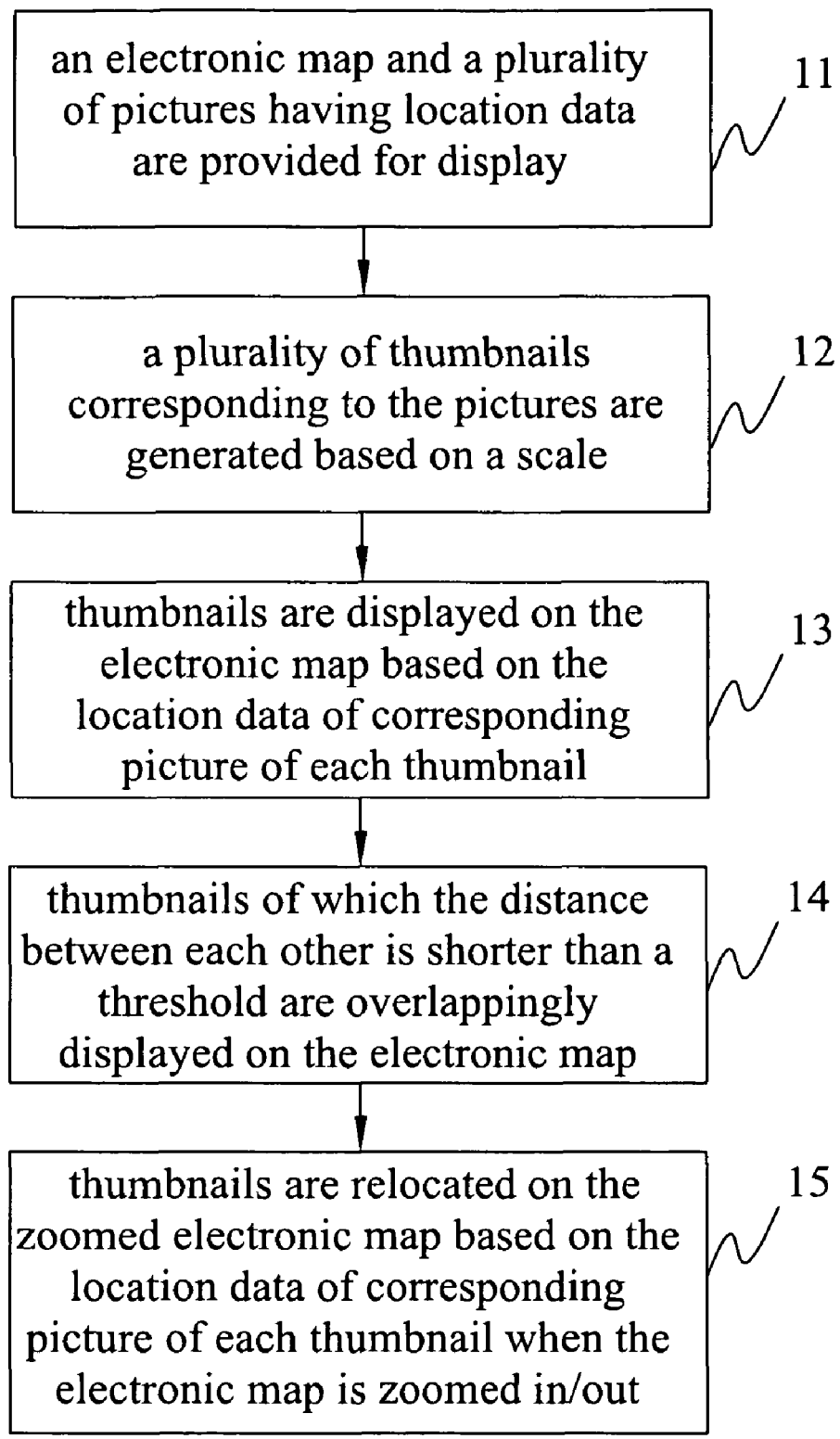
FIG. 1 illustrates a flow diagram illustrating the method of displaying picture having location data in accordance with the preset invention.

FIG. 1 illustrates a flow diagram of the method of displacing picture having location data of the present invention. In step 11 an electronic map and a plurality of pictures having location data are provided for display. The electronic map can be vector based or image based, and the image based electronic map may be provided as for example, a satellite photo with the longitude and latitude data. Preferably, the picture is the JPEG file embedded with EXIF GPS tags which contains longitude and latitude data of location where the JPEG file is captured, wherein EXIF is the abbreviated name of Extendible Image Format. Preferably, the picture further contains a correlation data, such as trip data.

In step 12 a plurality of thumbnails corresponding to the pictures are generated based on a scale. Preferably, the picture desired to display is scaled down to generate a corresponding thumbnail, and the viewer can recognize the content of the picture roughly by viewing the thumbnail. In step 13 the thumbnails are displayed on the electronic map based on the location data of corresponding picture of each thumbnail.

In step 14 the thumbnails of which the distance between each other is shorter than a threshold are overlappingly displayed on the electronic map. The distance can be the pixel distance between the displayed locations of two thumbnails and the threshold can be a minimum pixel distance between two thumbnails for clear viewing. The thumbnails overlappingly displayed can be defined as a thumbnail group, and the pictures in the same group can be selected or operated at the same time. Therefore, the thumbnails close together will be displayed overlappingly as a stack, so that the viewer can have better experience in viewing the map with thumbnails.

When the electronic map is zoomed in/out, the thumbnails will be relocated on the zoomed electronic map based on the location data of corresponding picture of each thumbnail in step 15. Preferably, when the thumbnail group is triggered, the electronic map is zoomed in to approximately relocate these thumbnails of the thumbnail group on the zoomed electronic map. Preferably, a thumbnail can be triggered to hyperlink to the corresponding picture.

Preferably, the pictures which are desired to display are selected based on the correlation data contained in the picture.

Figure 2:
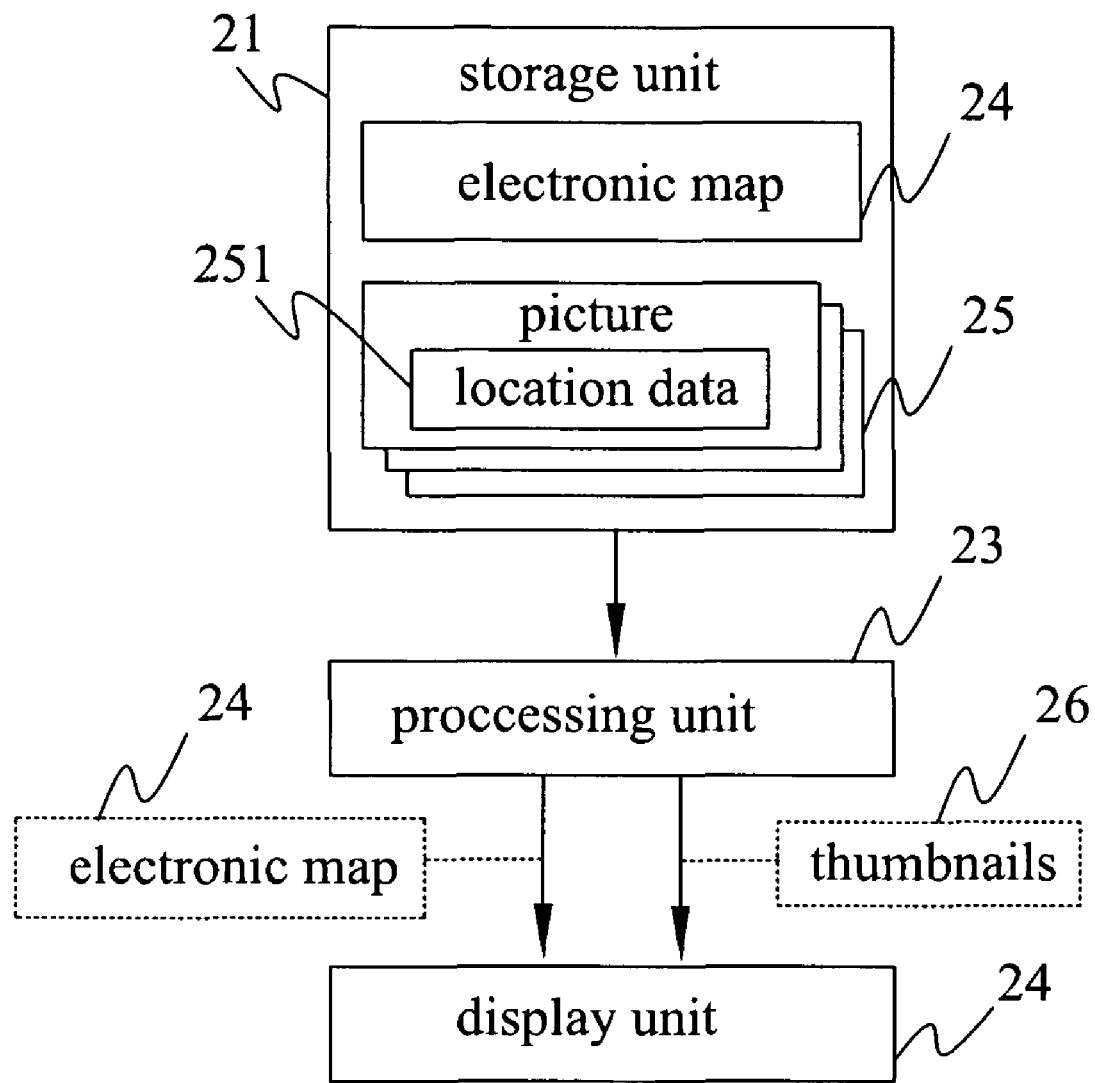
FIG. 2 illustrates a block diagram of picture display apparatus in accordance with the preset invention.

FIG. 2 illustrates a schematic block diagram of a picture display apparatus in accordance with the present invention. The picture display apparatus 2 may comprise a storage unit 21, a display unit 22 and a processing unit 23. The storage unit 21 is for storing an electronic map 24 and a plurality of pictures 25 having location data 251. The electronic map 24 can be vector based or image based, and the image based electronic map may be provided as for example, a satellite photo with the longitude and latitude data. Preferably, the picture 25 is the JPEG file embedded with EXIF GPS tags which contains longitude and latitude data of location where the JPEG file is captured, wherein EXIF is the abbreviated name of Extendible Image Format. Preferably, the picture 25 further contains a correlation data, such as trip data.

The processing unit 23, such as microcontroller or microprocessor, is for generating a plurality of thumbnails 26 corresponding to the pictures 25 based on a scale. Preferably, processing unit 23 scales down the picture desired to display to generate a corresponding thumbnail 26, and the viewer can recognize the content of the picture 25 roughly by viewing the thumbnail 26. Preferably, the scale of the thumbnails can be a predetermined value or decided by the user.

Then the processing unit 23 drives the display unit 22 to display the thumbnails 26 on the electronic map 24 based on the location data 251 of corresponding picture of each thumbnail 26 and overlappingly display the thumbnails 26 of which the distance between said plurality of thumbnails 26 is shorter than a threshold on the electronic map 24. The distance can be the pixel distance between the displayed locations of two thumbnails and the threshold can be a minimum pixel distance between two thumbnails for clear viewing. The thumbnails close together are displayed overlappingly as a stack, so that the viewer can have better experience in viewing the map with thumbnails Besides, the processing unit 23 can defines the thumbnails overlappingly displayed together as a thumbnail group. The pictures in the same group can be selected or operated at the same time If the picture 25 further contains a correlation data, such as trip data, the processing unit 23 can select the pictures which are desired to display based on the correlation data.

Preferably, the picture display apparatus 2 can further comprises an input unit which may alternatively be provided as for example, at least one button, a keypad, a touch pad or a mouse.

Preferably, when the thumbnail group is triggered, for example, a user operates the mouse to double click the thumbnail group, and the processing unit zooms in the electronic map to approximately relocate these thumbnails of the thumbnail group on the zoomed electronic map.

Preferably, a thumbnail can be triggered to hyperlink to the corresponding picture.

Preferably, the display unit 22 comprises a display panel and a display control unit with image buffer memory.

Preferably, the storage unit 21 comprises an ROM, an RAM, a flash memory or a hard disk.

Preferably, the picture display apparatus 2 can further comprises a networking unit for downloading the electronic map.

Figure 3:
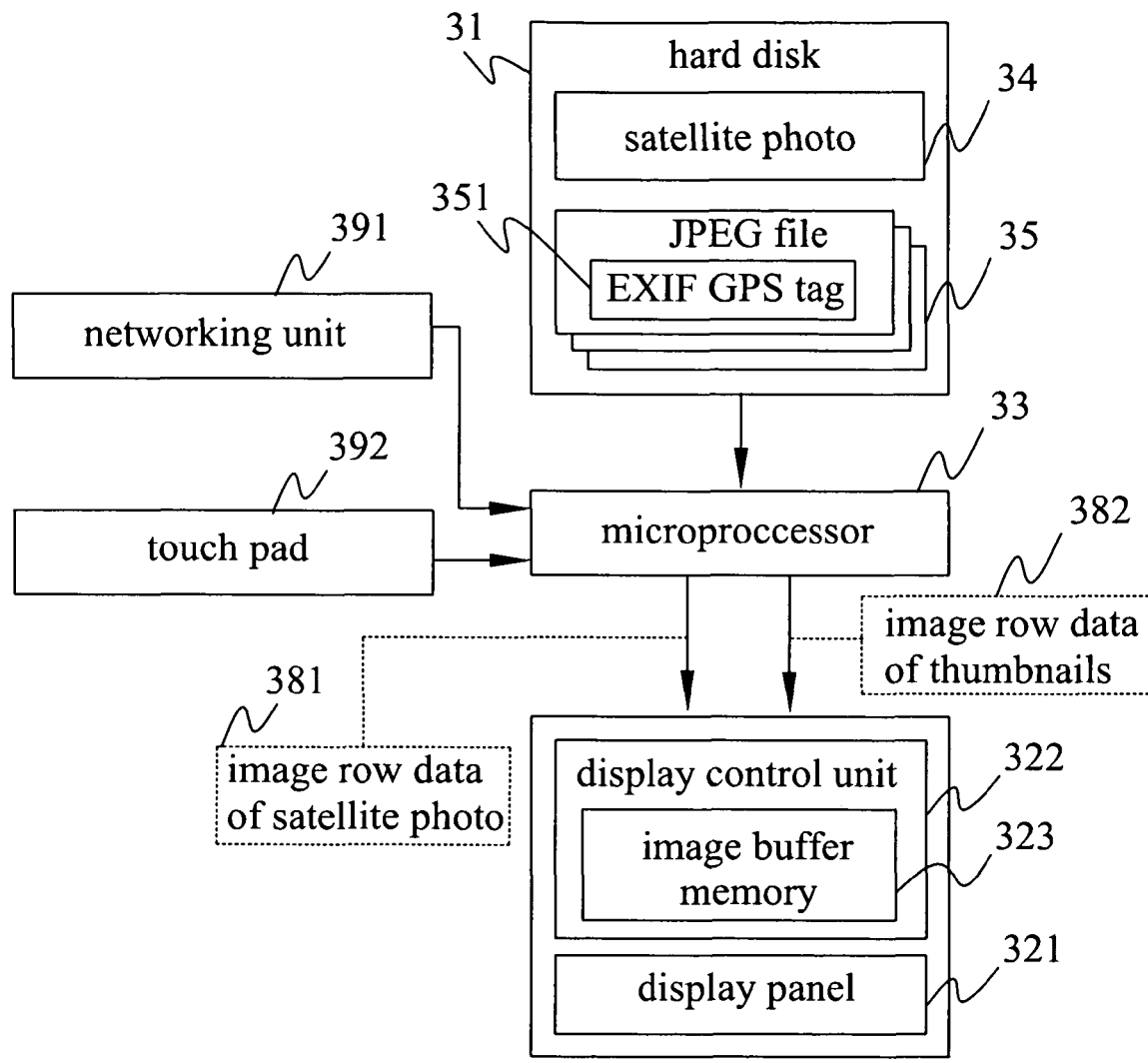
FIG. 3 illustrates a block diagram of the embodiment of a picture display apparatus in accordance with the present invention.

FIG. 3 illustrates a schematic block diagram of the embodiment of a picture display apparatus in accordance with the present invention. The picture display apparatus 3 may comprise a hard disk 31, a display panel 321, a display control unit 322, image buffer memory 323, a microprocessor 33, a networking unit 391 and a touch pad 392. The hard disk 31 is for storing at least one satellite photo 34 and JPEG files 35 embedded with EXIF GPS tags 351 which contains longitude and latitude data of JPEG files 35. The satellite photo 34 can be stored in advance or downloaded from a remote server in real time by the networking unit 391 when the user wants to display these JPEG files 35.

The microprocessor 33 fetches the satellite photo 34 from hard disk 31 and decodes the satellite photo 34 for obtaining the image raw data contained in satellite photo 34, and then the microprocessor 33 transforms the resolution of image raw data to match the size of the image buffer memory 323 and copies the transformed image raw data 381 to the image buffer memory 323.

The microprocessor 33 then fetches the JPEG file 35 which is desired to display from hard disk 31 and decodes JPEG files 35 for obtaining the image raw data contained in the JPEG files 35, and generates a corresponding thumbnail by reducing the resolution of the image raw data. Preferably, the viewer can recognize the content of the JPEG file 35 roughly by viewing the thumbnail.

The microprocessor 33 calculates pixel location of the thumbnail based on longitude and latitude data of the JPEG file 35 and longitude and latitude data of satellite photo 34. After calculating all pixel location of thumbnails corresponding to the JPEG files 35 which are desired to display, the microprocessor 33 compares the distances between pixel locations of thumbnails with a threshold. The threshold can be a minimum pixel distance between two thumbnails for clear viewing.

If the distance between pixel locations of two thumbnails is smaller than the threshold, these two thumbnails may not be recognized clearly while being displayed on the satellite photo 34, so the microprocessor 33 defines the thumbnails of which the distance between said plurality of thumbnails is shorter than the threshold as a thumbnail group and overlaps these thumbnails in stack to generate the image raw data of thumbnail group.

Figure 4A:
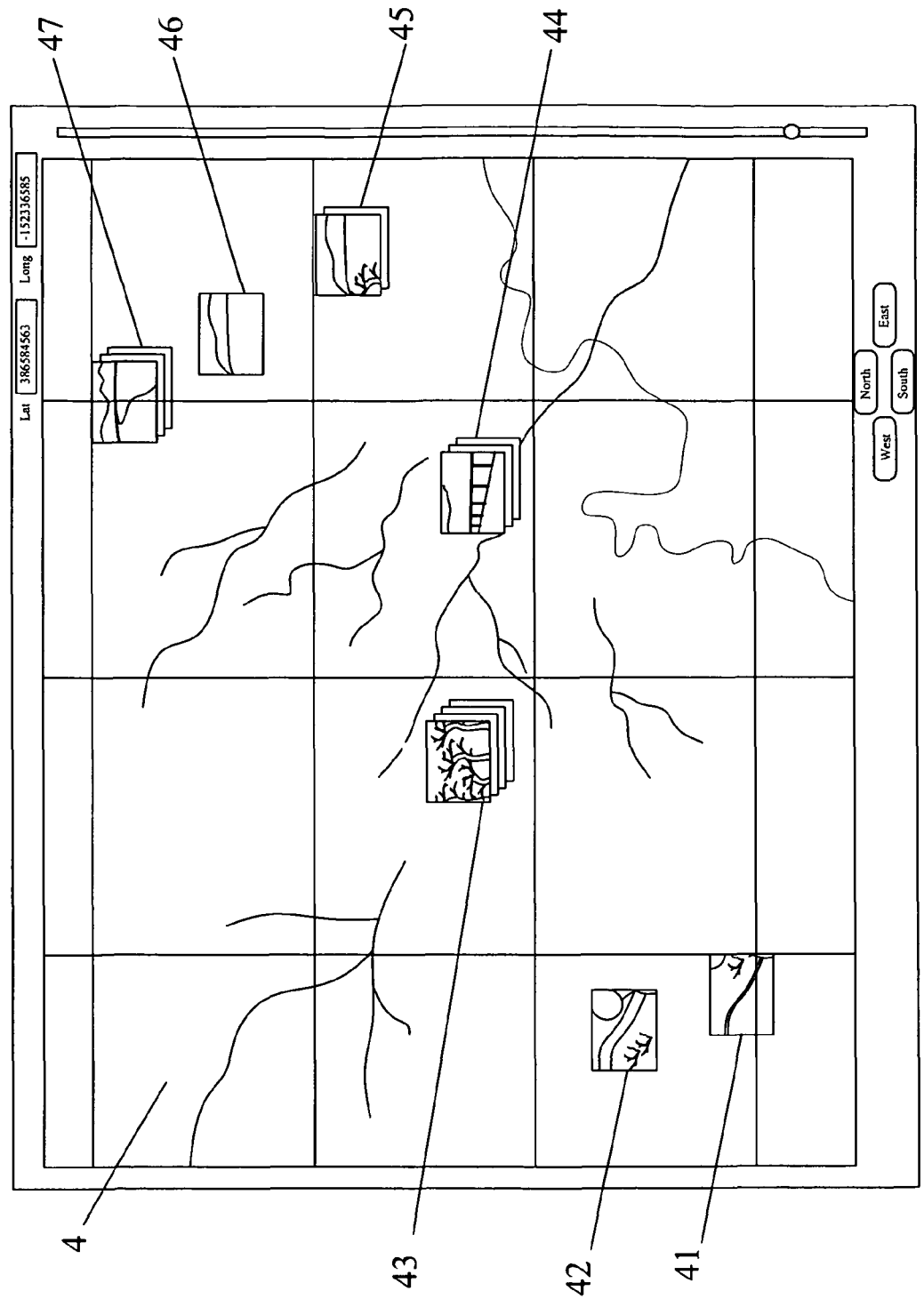
FIG. 4A illustrates a schematic view of an embodiment of display of picture and an electronic map.

The microprocessor 33 then copies the image raw data 382 of the thumbnail or thumbnail group to the image buffer memory 323 based on its pixel location. Over a predefined period of time, such as 33.3 ms or 16.6 ms, the display control unit 322 transforms the data stored in the image buffer memory 323 into electric signal which is then transmitted to the display panel 321 for display, as shown in FIG. 4A which illustrates a schematic view of an embodiment of display of picture and an electronic map. In FIG. 4A, there are three thumbnails (41, 42, and 45) and four thumbnail groups (43, 44, 45, and 47) displayed on a satellite photo 4.

When the user operates the picture display apparatus 3 to zoom in/out the displayed satellite photo 34 by the touch pad 392, the microprocessor 33 re-transforms the resolution of image raw data of satellite photo 34 based on inputted scale. If the resolution of the transformed image raw data is higher than the image buffer memory 323, the microprocessor 33 selects a matching area for the image buffer memory 323 in the transformed image raw data and copies the image raw data 381 in the matching area from the transformed image raw data to the image buffer memory 323 for display.

The microprocessor 33 then re-calculates pixel location of the thumbnail based on longitude and latitude data of the JPEG file 35, longitude and latitude data of satellite photo 34, and the size and the pixel location of the matching area. After calculating all pixel location of thumbnails corresponding to the JPEG files 35 which are desired to display, the microprocessor 33 repeats the comparing process mentioned above to determined which thumbnail is overlapping displayed.

Figure 4B:
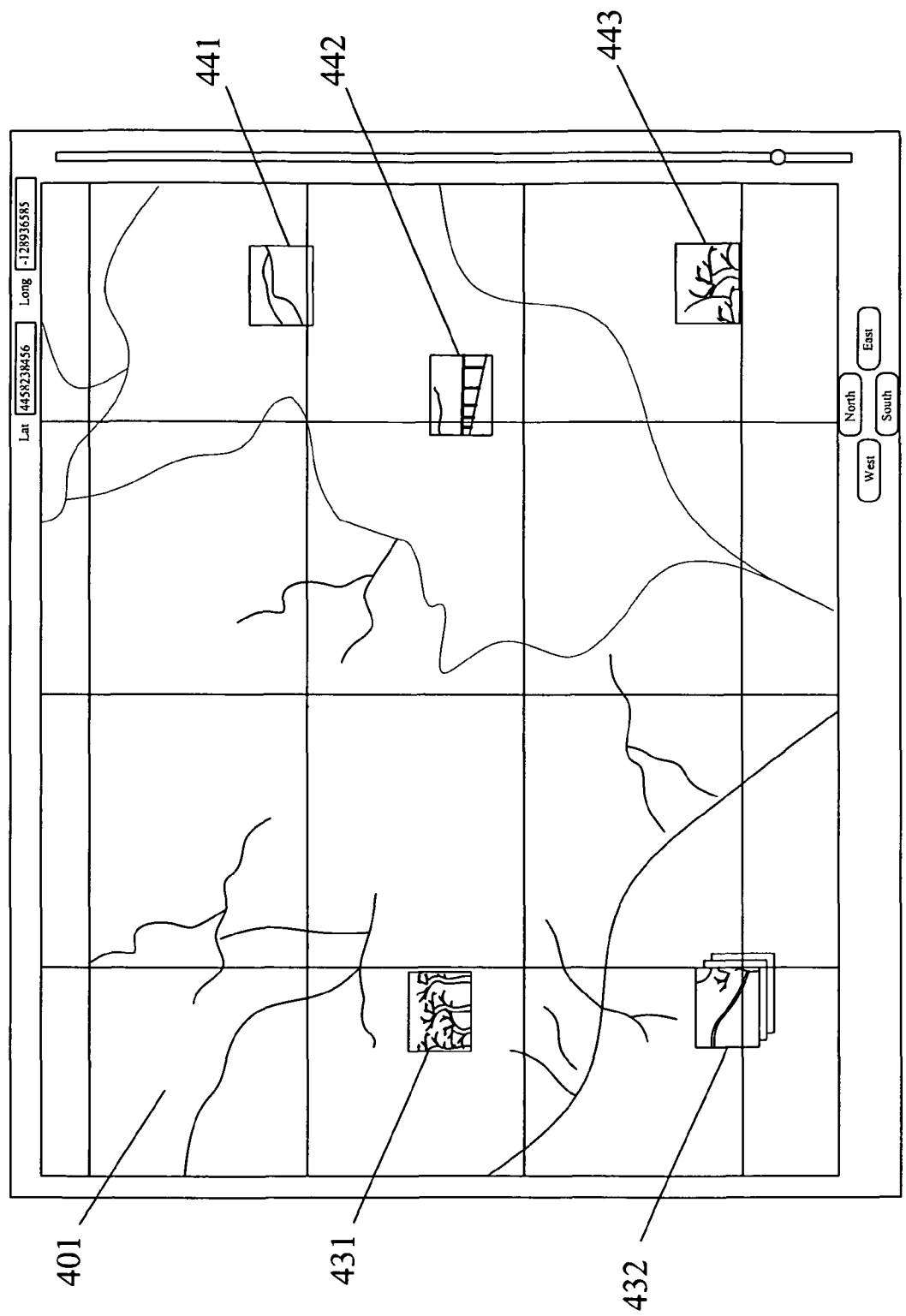

The microprocessor 33 then copies the image raw data 382 of the thumbnail or thumbnail group to the image buffer memory 323 based on its pixel location for display, as shown in FIG. 4B which illustrates a schematic view of an embodiment of display of picture and an electronic map after zooming in. In FIG. 4B, there are four thumbnails (431, 441, 442, and 443) and one thumbnail group 432 displayed on a transformed satellite photo 401.

Therefore, when the displayed satellite photo 34 is zoomed in/out, only the display locations of the thumbnails changes or several thumbnails are displayed overlappingly, and the display size of the thumbnails will not change.

Figure 4C:
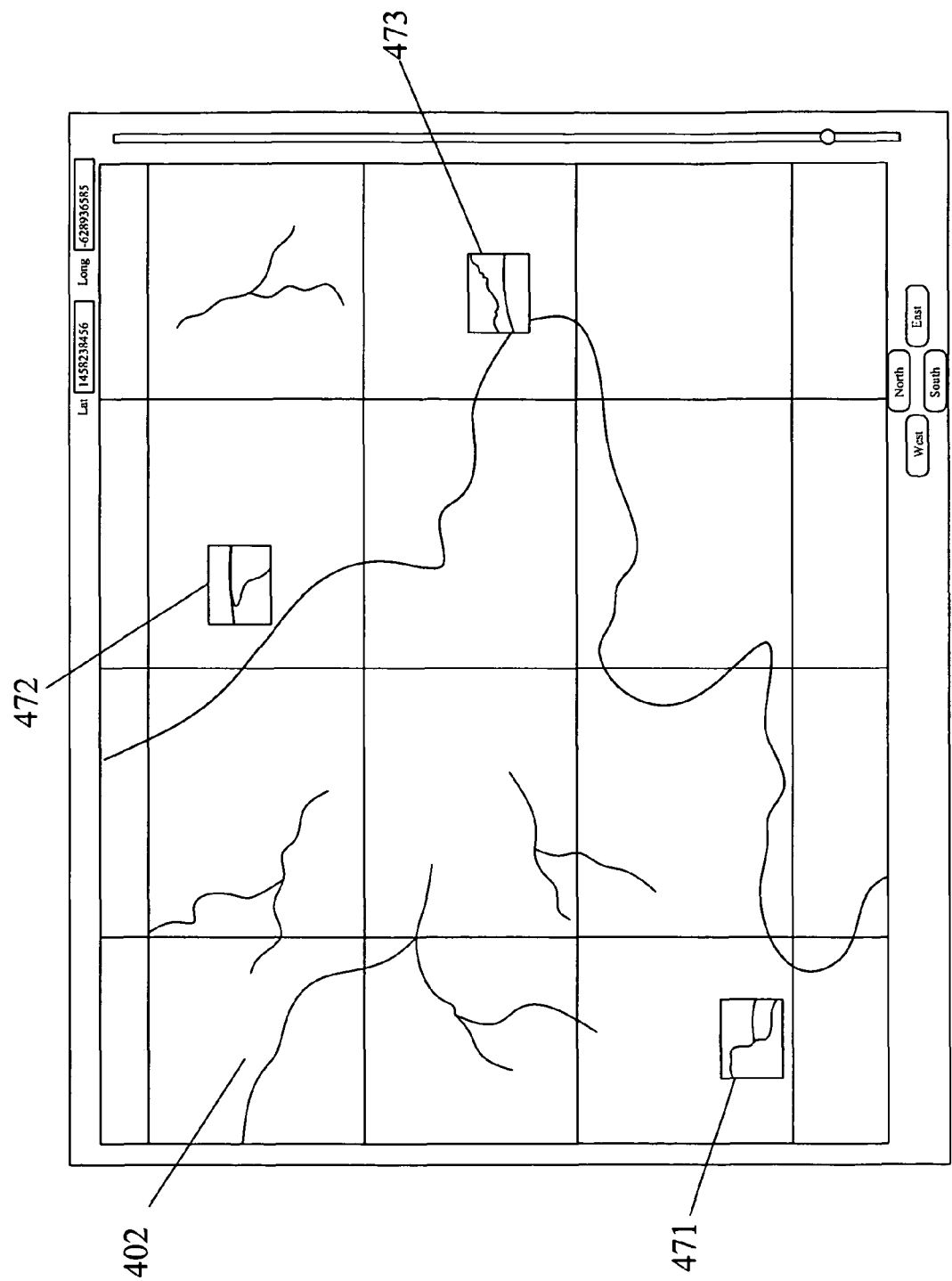
FIG. 4C illustrates a schematic view of an embodiment of display of picture and an electronic map after a thumbnail group is triggered.

When the user triggers one thumbnail group by the touch pad 392, microprocessor 33 re-transforms the resolution of image raw data of satellite photo 34 for clearly displaying thumbnails of the triggered thumbnail group without any thumbnail being overlappingly displayed. The microprocessor 33 then selects a matching area for the image buffer memory 323 in the transformed image raw data and copies the image raw data 381 of the matching area from the transformed image raw data to the image buffer memory 323 for display. The microprocessor 33 repeats the pixel location calculating process mentioned above and copies the image raw data 382 of the thumbnails to the image buffer memory 323 based on its pixel location for display, as shown FIG. 4C which illustrates a schematic view of an embodiment of display of picture and an electronic map after a thumbnail group 47 is triggered. In FIG. 4C, there are three thumbnail (471, 472, and 473) displayed on the transformed satellite photo 402.

Preferably, the thumbnail can be triggered to hyperlink to the corresponding JPEG files 35. When the user triggers one thumbnail by the touch pad 392, the picture display apparatus 3 may display the corresponding JPEG files 35 in larger size or full screen for clearly viewing.

Figure 4D:
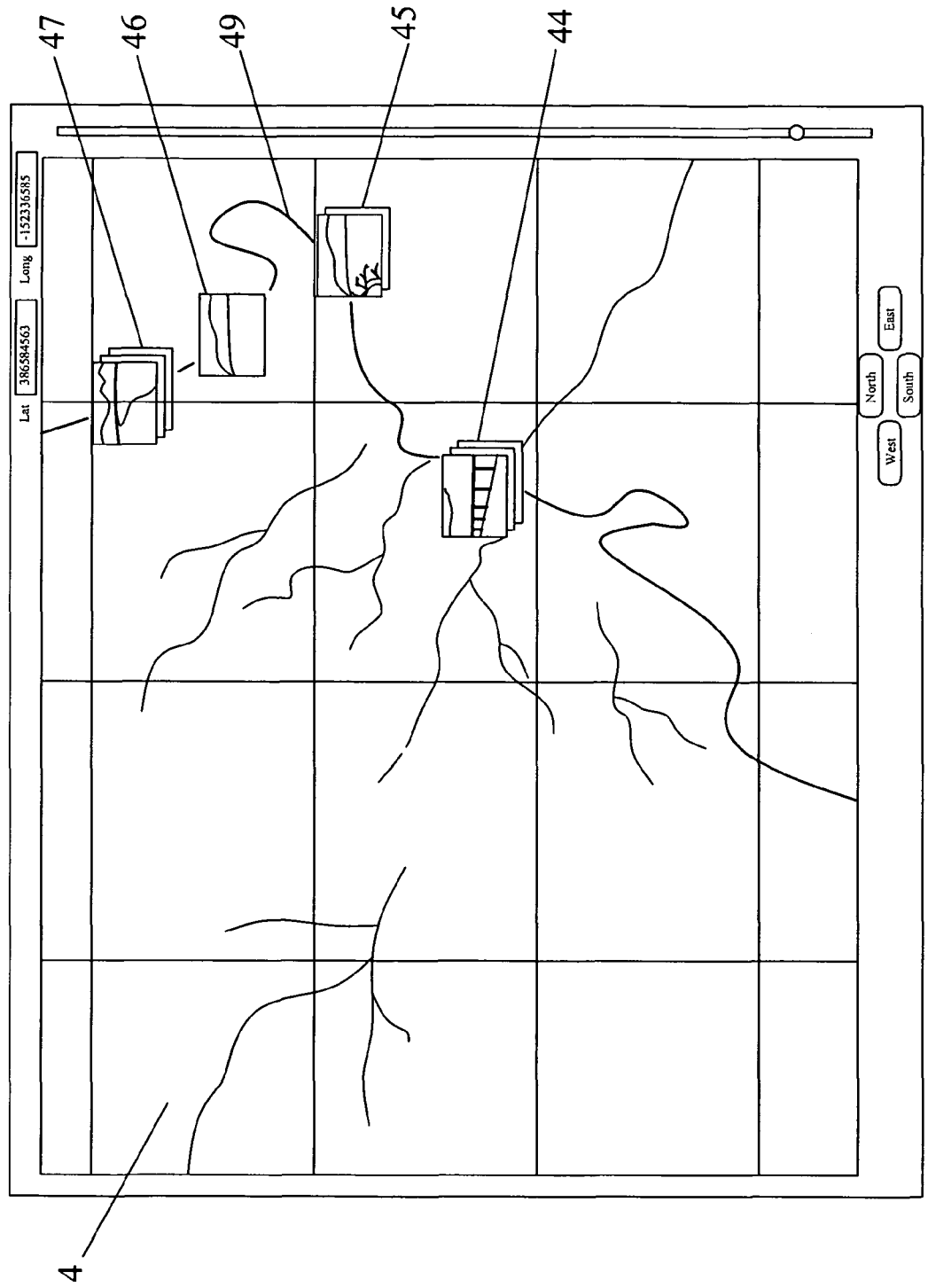
FIG. 4D illustrates a schematic view of an embodiment of display of picture and an electronic map based on a trip data.

Besides, if the tags 351 embedded in JPEG files 35 contain a correlation data, such as a trip data, microprocessor 33 can select the JPEG file 35 containing the trip data selected by the user, and only the thumbnails of the selected JPEG files 35 are displayed on the satellite photo. Preferably, the route of the trip data selected by the user is also displayed on the satellite photo 34, as shown in FIG. 4D. In FIG. 4D, there are one route 49, one thumbnail 46 and three thumbnail groups (44, 45, and 47) displayed on the satellite photo 4, without thumbnail 41, 42 and thumbnail group 43. Comparing to FIG. 4A, FIG. 4D can be displayed in a meaningful way for the traveler.

While the present invention has been described by way of example and in terms of a preferred embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of displaying picture having location data, comprising the steps of:
   providing an electronic map and a plurality of pictures having location data;
   generating a plurality of thumbnails corresponding to said pictures based on a scale;
   displaying said thumbnails on said electronic map based on said location data of corresponding picture of each thumbnail; and
   overlappingly displaying said thumbnails of which the distance between said thumbnails is shorter than a threshold on said electronic map.

2. The method of claim 1, further comprising a step of relocating said thumbnails on said zoomed electronic map based on said location data of corresponding picture of each thumbnail when said electronic map is zoomed in/out.

3. The method of claim 1, further comprising a step of defining said thumbnails of which the distance between each other is shorter than said threshold value as a thumbnail group.

4. The method of claim 3, further comprising a step of zooming in said electronic map and relocating said thumbnails of said thumbnail group on said zoomed electronic map when said thumbnail group is triggered.

5. The method of claim 1, wherein said thumbnail can be triggered to hyperlink to said corresponding picture.

6. The method of claim 1, wherein said location data comprises longitude and latitude data.

7. The method of claim 1, wherein said picture further comprises a correlation data.

8. The method of claim 7, further comprising a step of selecting said pictures which are desired to display based on said correlation data.

9. The method of claim 8, wherein said correlation data is a trip data.

10. The method of claim 1, wherein said electronic map is vector based or image based.

11. The method of claim 10, wherein the image based electronic map can be a satellite photo with the longitude and latitude data.

12. A picture display apparatus, comprising:
    a storage unit, for storing an electronic map and a plurality of pictures having location data;
    a display unit; and
    a processing unit, for generating a plurality of thumbnails corresponding to said pictures based on a scale, and driving said display unit to display said thumbnails on said electronic map based on said location data of corresponding picture of each thumbnail and overlappingly display said thumbnails of which the distance between said thumbnails is shorter than a threshold value on said electronic map.

13. The picture display apparatus of claim 12, further comprising an input unit, wherein said processing unit relocates said thumbnails on said zoomed electronic map based on said location data of corresponding picture of each thumbnail when a user operates said picture display apparatus to zoom in/out said electronic map by said input unit.

14. The picture display apparatus of claim 12, wherein said processing unit defines said thumbnails of which the distance between each other is shorter than said threshold value as a thumbnail group.

15. The picture display apparatus of claim 14, wherein said processing unit zooms in said electronic map and relocating said thumbnails of said thumbnail group on said zoomed electronic map when said user triggers said thumbnail group by said input unit.

16. The picture display apparatus of claim 12, wherein processing unit drives said display unit to display said corresponding picture when said user triggers said thumbnail by said input unit.

17. The picture display apparatus of claim 12, wherein said location data comprises longitude and latitude data.

18. The picture display apparatus of claim 12, said picture further comprises a correlation data.

19. The picture display apparatus of claim 18, said processing unit selects said pictures which are desired to display based on said correlation data.

20. The picture display apparatus of claim 18, wherein said correlation data is a trip data.

21. The picture display apparatus of claim 12, wherein said electronic map is vector based or image based.

22. The picture display apparatus of claim 21, wherein the image based electronic map can be a satellite photo with the longitude and latitude data.

23. A method of displaying picture having location data, comprising the steps of:
- providing an electronic map and a plurality of pictures having location data;
- generating a plurality of thumbnails corresponding to said pictures based on a scale;
- displaying said thumbnails on said electronic map based on said location data of corresponding picture of each thumbnail;
- relocating said thumbnails on said zoomed electronic map based on said location data of corresponding picture of each thumbnail when said electronic map is zoomed in/out; and
- overlappingly displaying said thumbnails of which the distance between said thumbnails is shorter than a threshold on said electronic map.

24. The method of claim 23, further comprising a step of defining said thumbnails of which the distance between each other is shorter than said threshold value as a thumbnail group.

25. The method of claim 24, further comprising a step of zooming in said electronic map and relocating said thumbnails of said thumbnail group on said zoomed electronic map when said thumbnail group is triggered.

26. The method of claim 23, wherein said thumbnail can be triggered to hyperlink to said corresponding picture.

27. The method of claim 23, wherein said location data comprises longitude and latitude data.

28. The method of claim 23, wherein said picture further comprises a correlation data.

29. The method of claim 28, further comprising a step of selecting said pictures which are desired to display based on said correlation data.

30. The method of claim 29, wherein said correlation data is a trip data.

31. The method of claim 23, wherein said electronic map is vector based or image based.

32. The method of claim 31, wherein the image based electronic map can be a satellite photo with the longitude and latitude data.

* * * * *